Nov. 11, 1930. E. H. LICHTENBERG 1,780,932
CONTROL MECHANISM FOR CONCRETE MIXERS
Filed Aug. 29, 1929  3 Sheets-Sheet 1
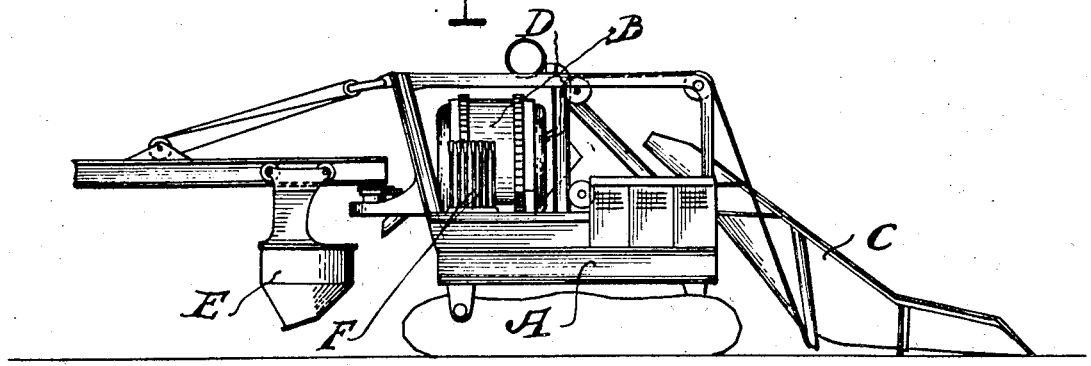
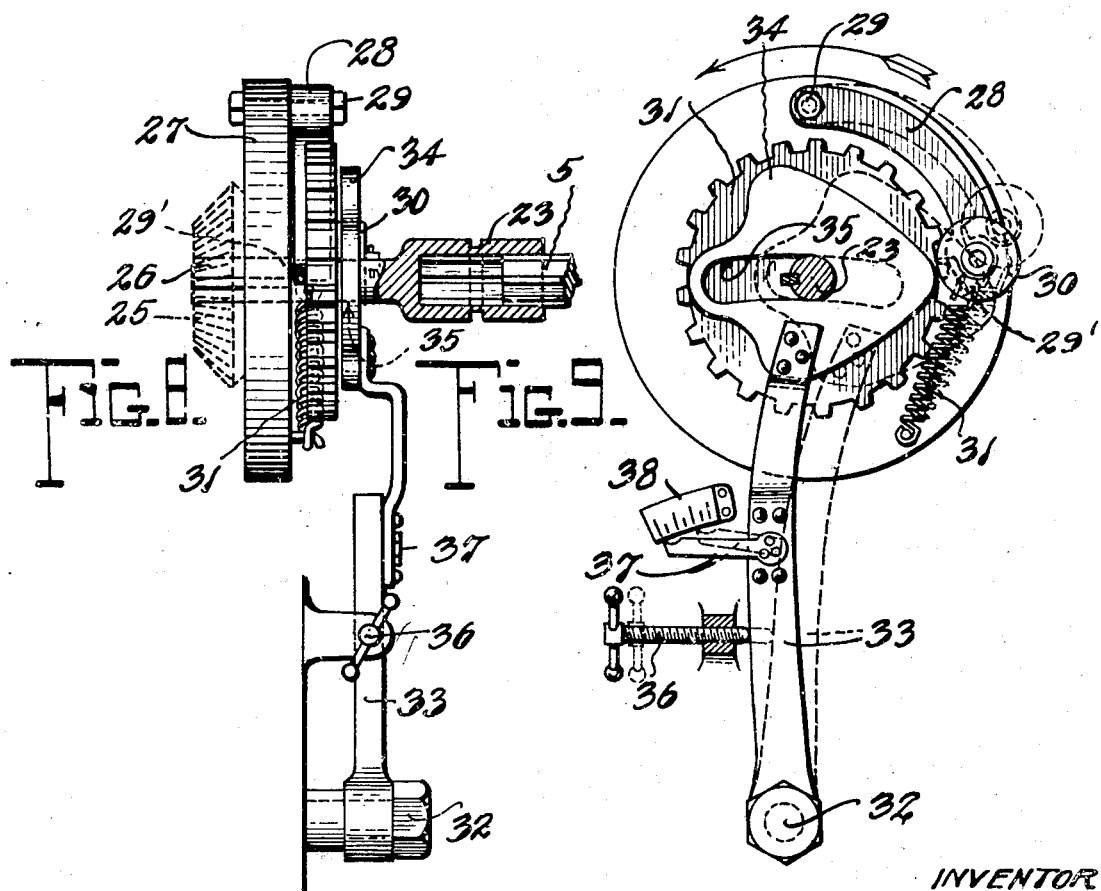
INVENTOR
E. H. Lichtenberg
BY
Robb & Robb,
ATTORNEYS

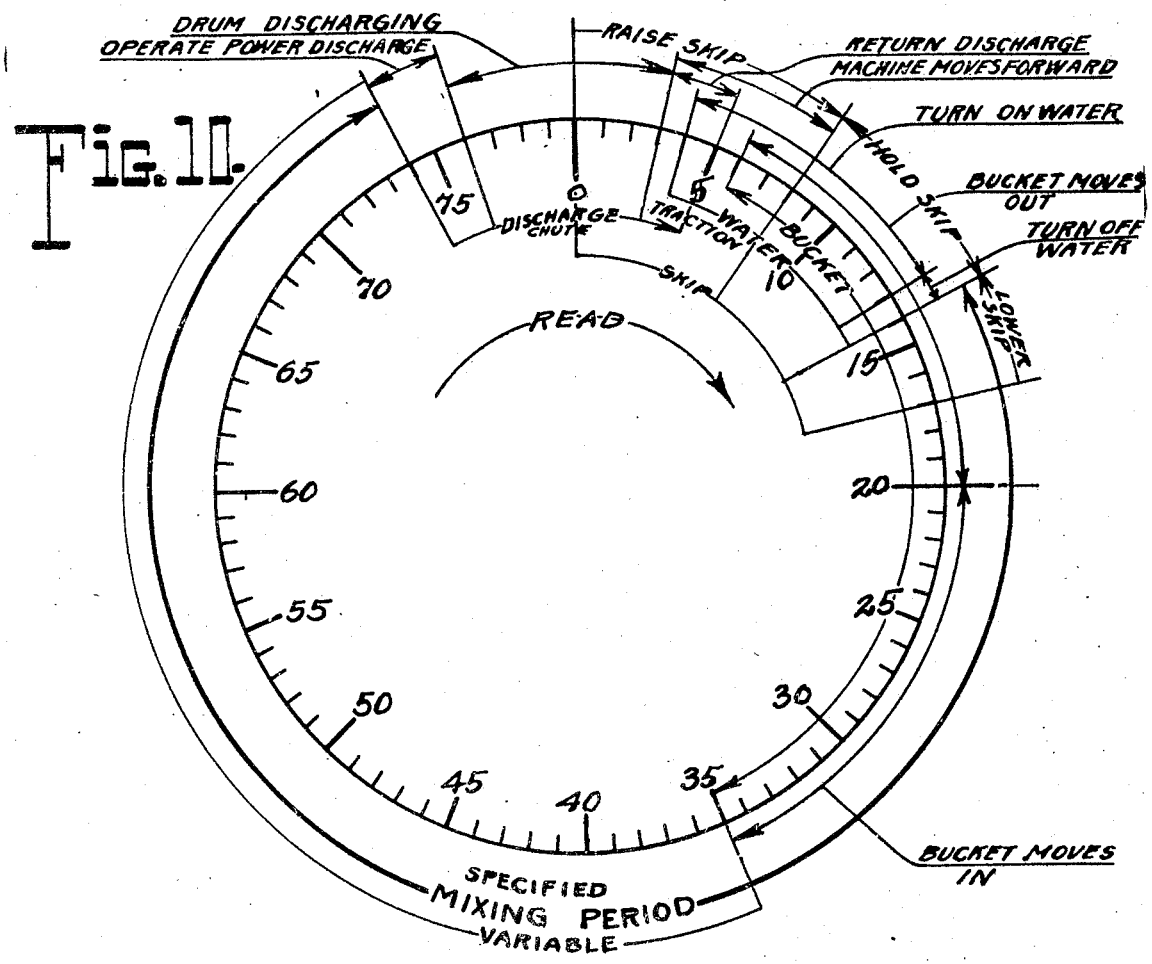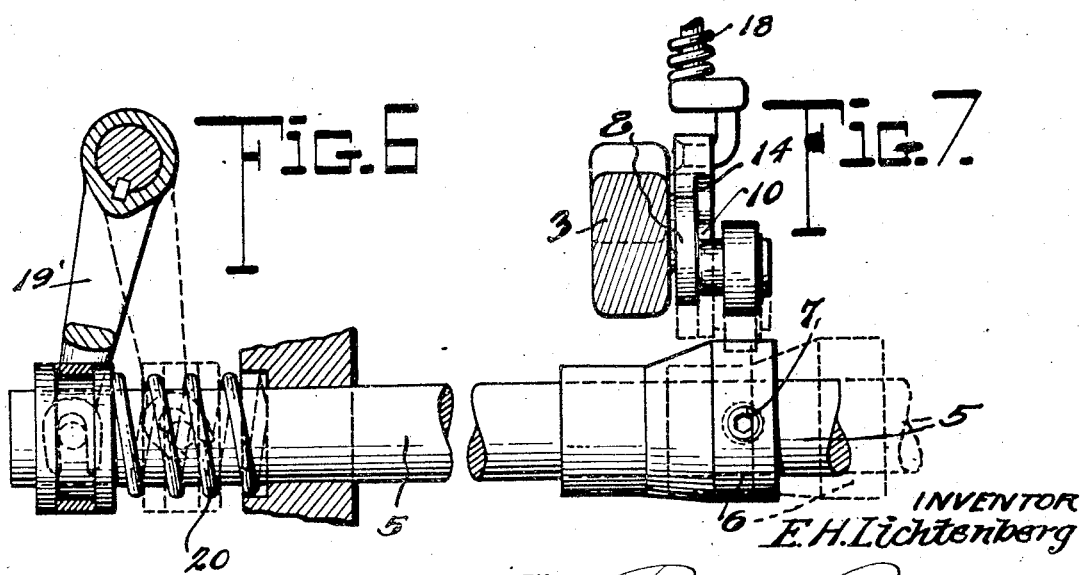

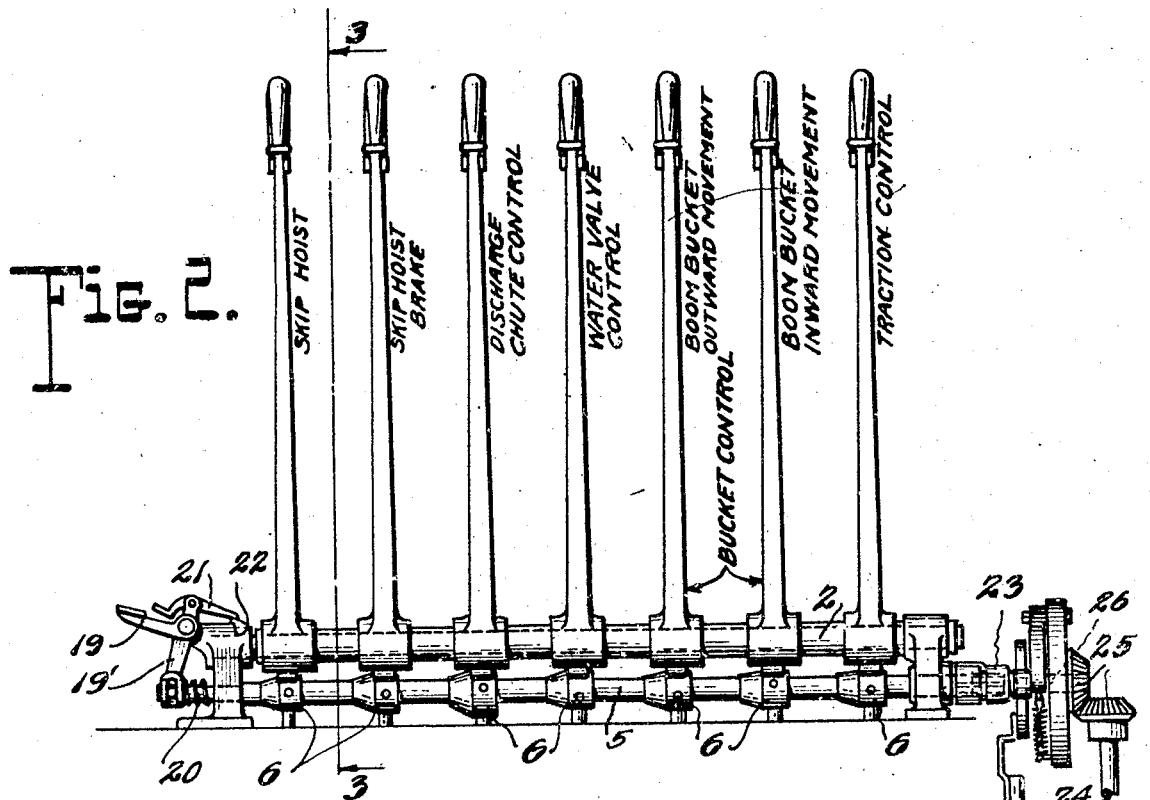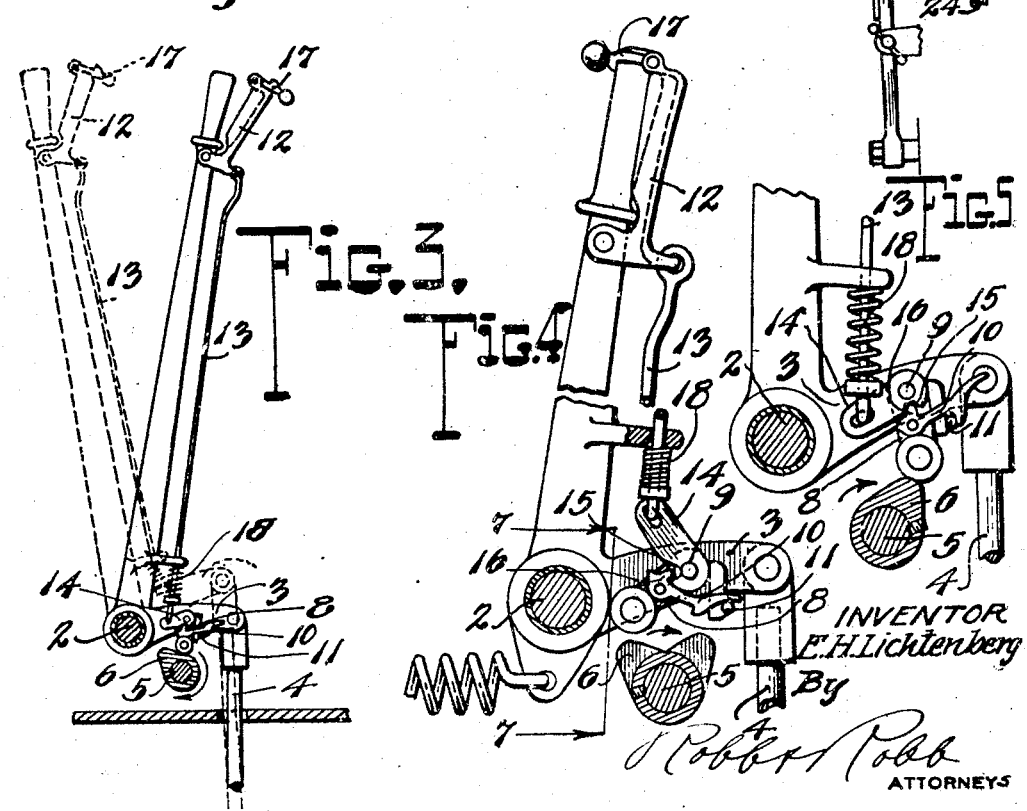

Patented Nov. 11, 1930

1,780,932

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

CONTROL MECHANISM FOR CONCRETE MIXERS

Application filed August 29, 1929. Serial No. 389,210.

In the highly organized concrete mixing machines now in common use, there are involved a series of operations of the various units of the apparatus which take place in the cycle of mixing. Some of these operations when properly carried out overlap and all of them should be synchronized in relation to each other if economy of time is to obtain.

Reference is made to the operations of charging the aggregates into the mixing drum, introducing water thereinto, discharging the drum contents, and distributing the mixed concrete, including restoration of the means for carrying out these functions to normal positions.

It has heretofore been proposed to render certain of these operations automatic under the control of a batchmeter device, which is set in operation by the charging movement of the loading skip, as exemplified in the patent to John F. Robb, No. 1,660,301, dated February 21, 1928, and this patent discloses suitable manually controlled means for interfering with the automatic operations when necessary or desirable, the interference being in the nature of a cessation of the automatic cycle whenever the interfering instrumentality is brought into play.

In the present improvements, it is primarily the object to eliminate entirely this batchmeter instrumentality, while maintaining the automatic operation of the various units, by the provision of a special control mechanism involving a manually operable bank of lever controls, in which all the various manual controls are centralized to enable their automatic operation by a single means in the nature of a common actuator, when the apparatus is to be operated as an automatic machine. This actuator is power driven and is characterized by a multi-cam arrangement adapted to cooperate with the manual lever controls, greatly simplifying the construction and assembly of the mechanisms.

In carrying out this invention, two important features are incorporated in the unified control, namely, the provision of means for throwing out the mechanically actuated common actuator, thereby rendering all functions of the machine manually independently controllable, and other means for optionally throwing out any one or more of said manual controls in relation to the actuator to render them inoperative thereby but free to be manually operated at will.

In addition to the foregoing there is embodied a novel arrangement for varying the mixing period either to increase or decrease the same, this mechanism involving an interruption of the operation of the actuator for a predetermined time, said mechanism being automatic in its functioning.

By this flexible control, it is possible to obtain, therefore, a variety of combinations of automatic and manually controlled operations, all depending upon the circumstances or the desires of the operator of the machine.

Other and further objects and advantages of the invention will be hereinafter set forth and the novel features thereof defined by the appended claims.

In the drawings:

Fig. 1 is a diagrammatic view of a concrete mixing apparatus having my invention applied thereto;

Fig. 2 is a view in elevation of the control mechanism unit constituting a preferred embodiment of my invention;

Fig. 3 is a transverse sectional view on the line 3—3 of Fig. 1, showing in full lines the normal position of a control lever and in dotted lines when shifted to produced operation of the mechanism controlled thereby;

Fig. 4 is an enlarged detail view showing the latching means carried by each control lever for rendering the lever inoperative relative to its associated cam shaft;

Fig. 5 is a similar view with the latch means released and the roller contact arm relatively rigid for cooperation with the cam shaft;

Fig. 6 is a fragmentary sectional view of the throw-out mechanism for the cam shaft;

Fig. 7 is a view on the line 7—7 of Fig. 4;

Fig. 8 is a rear elevation of the automatic interrupter arranged between the cam shaft and the power drive therefor;

Fig. 9 is a side elevation thereof; and

Fig. 10 is a diagrammatic view showing the cycle of operations of the mixing machine.

Like reference characters refer to like parts in the several figures of the drawings.

Fig. 1 is a diagrammatic view of a concrete mixing apparatus of the general type to which my invention is designed to be applied, this apparatus embodying a tractor frame A upon which is mounted a mixing drum B, a loading skip C, the distributor bucket E and the lever control unit F.

The present invention resides in this unit control F by means of which the operations of the other instrumentalities referred to above are controlled. No attempt is made herein to show the connections between the levers of this control unit and the instrumentalities mentioned, since these are of the usual type and such connections form no part of the present invention.

Referring to the control unit generally designated F, and particularly to Figs. 2 to 5, I provide a bank of levers preferably assembled on a common shaft 2 located at a convenient place upon the operator's platform, each of these levers having an offstanding arm 3 to which is connected an operating rod 4 by means of which the control is transmitted to the respective part of the mixing apparatus. Each of these levers serves a particular instrumentality or instrumentalities such as the skip hoist, skip hoist brake, etc., as designated generally in Fig. 2 of the drawings.

I arrange parallel to the shaft mounting 2 a cam shaft 5, forming part of this unit and having attached thereto a series of cams 6 for cooperating with the respective levers when the control of the respective mechanisms is intended to be mechanically or automatically operated. Each cam 6 is adjustable relatively on the shaft and is secured by a set screw 7 so that it may be positioned to occupy a particular relationship to its companion cams, whereby each of the instrumentalities controlled will operate in proper sequence. For example, the first cam action in the cycle of mixing may be that cam which controls the operation of the discharge chute, the next the raising of the skip, followed by the water valve control, after which the mixing operation continues until the discharge chute is again shifted and the mixing apparatus is moved to a different position.

In order to make the control optionally manual or automatic, I provide special latching mechanism for the control levers. Upon the arm 3 of each lever a roller contact arm 8 is mounted to swing upon a pivot 9. When this arm is in the position shown in Fig. 5, it is locked rigidly for contact with its cam 6 as the latter is rotated by the common actuator shaft 5. This locked position is obtained by the coaction of the pawl 10 with the projection 11 extending from the arm 3 of the lever, it being understood that the cam shaft 5 and its cams rotates in the direction of the arrow in Fig. 5. Obviously whenever the cam is rotated into contact with the roller arm 8, the lever control associated with the cam is shifted toward the dotted line position shown in Fig. 3 of the drawings and the instrumentality to which this lever is operatively connected is set into operation. This is the automatic phase of operation of the control unit and applies to each of the levers in the bank of controls embodied in this unit.

When any one of these lever controls is to be rendered inoperative with respect to the cam shaft, the grip member 12 of the particular lever is actuated, this in turn by the connecting rod 13, shifting a release member 14 pivoted upon the pin 9. This member 14 is formed with a projection 15 which engages a nib 16 on the latch member 10, rocking said latch member out of engagement with the projection 11 and simultaneously shifting the roller contact arm 8 into the inoperative position shown in Fig. 4. This shifts the roller contact arm out of the path of movement of its cooperating cam 6 and leaves the lever free of the automatic control and shiftable at will by the operator. To hold this position a weighted latch 17 mounted on the end of the grip 12 is provided to swing over the extremity of the lever, as shown clearly in Fig. 4 of the drawings. When it is again desired to render this lever automatically operable, the latch 17 is disengaged from the handle and the spring 18 will throw the roller contact arm about its pivot until the latch 10 is engaged with the projection 11.

The foregoing explanation describes the manner in which any one of the levers of the bank control may be rendered independently operable manually, but there may be conditions under which it is desirable to render the automatic or mechanical control of these levers inoperative with respect to all of them and under such conditions it is only necessary to impart to the cam shaft 5 a longitudinal movement, thereby shifting all of the cams into an inoperative position with respect to the roller contact arms of the levers. For this purpose I have provided a manual or foot operated shifter 19 in the nature of a bell crank, one arm of which is a depressible one and the other arm of which is connected by a forked connection to the end of the shaft 5, as shown clearly in Figs. 1 and 6. The forked arm 19' in shifting the shaft 5, compresses a spring 20 which is designed to return the shaft to normal position when the shifter 19 is released by operation of the locking pawl 21 which is engaged with a projection 22 incident to the initial longitudinal movement just referred to.

At the end of the shaft a sliding or spline connection between the cam shaft and the driven member 23 is provided, as shown clearly in Fig. 8 which depicts the interrupted mechanism intermediate the power drive and the cam shaft now to be specifically set forth.

It is well known by those skilled in this art that the time of mixing of a batch of concrete differs with the differing conditions or uses of the concrete material, so that it becomes desirable to enable a prolonging or shortening of the mixing period from one operation to another. Under present conditions this mixing period is controlled practically in every instance by a device known as the batchmeter. This mechanism is of a complicated nature and involves intricate connections between the controlled parts, and my aim has been to eliminate entirely this instrumentality by providing for an automatic interrupter capable of being variably adjusted and affecting the mechanism of the bank lever control only during the mixing period of the mixing apparatus.

Referring to Figs. 2 and 8, 24 designates a shaft operated by the prime mover of the apparatus, this shaft being in turn connected by the beveled gears 25 to the driving shaft or element 26 of the control unit. Upon the end of the shaft 26 is secured a disc 27 upon one face of which, adjacent the periphery, is pivotally mounted a curved arm 28, the pivot therefor being designated 29. This arm is formed with a projection or a lug 29' and has a roller 30 mounted at the free end thereof. Adjacent the disc 27 is arranged a spur gear 31 secured upon the driven shaft or member 23 in the notched periphery of which the lug 29' is adapted to engage under the influence of the spring 31. When this engagement takes place, the drive from the engine to the cam shaft 5 is produced.

Upon the pivot 32 I mount a supporting arm 33, carrying at its end a fixed heart-shaped cam 34, having a slot 35 therein through which the shaft 23 extends. At one side of the supporting arm 33 is an adjusting screw or stop 36, by means of which the cam 34 may be suitably adjusted in its relation to the position of the roller 30.

When it is desired to increase the length of the mixing period, the driving connection between the shafts 26 and 5 is disconnected by withdrawing the pawl 28 from engagement with the teeth of the ratchet element or gear 31 during a fraction of the revolution of the member 27. This is accomplished by the cam 34 upon the cam face of which the roller 30 will ride until approximately the peak of the cam is reached, when the projection 29' will be disengaged. As the roller passes over the peak and down upon the other cam face, the projection 29' is allowed to re-engage the member 31 and the drive to the cam shaft is again continued. Obviously the time of engagement and disengagement is controlled by the adjustment of the set screw 36. As a matter of convenience for indicating the length of the mixing period, I provide an indicator hand 37 which works in relation to the scale 38 mounted upon a stationary part adjacent the support 33.

It will thus be seen that by means of this interruption mechanism incorporated in the drive to the cam shaft, I am able to secure an automatic interference with the drive to a greater or lesser degree during the mixing period for control of this period according to the conditions which may be specified in relation to the time of the mix.

For a simple understanding of the cycle of operation of the machine, I have illustrated diagrammatically in Fig. 10 the period of operation of the respective units of the apparatus. This includes not only the charging and discharging of the mix and the water control, but also the operation of the bucket distributor and the automatic advancement of the mixing machine. Any one of the controls, however, may be rendered inoperative so far as the mechanical or power actuation is concerned, leaving the control or controls for manual operation at will be the operator.

Other and further objects and advantages of the invention will be hereinafter set forth and the novel features thereof defined by the appended claims.

Having thus described my invention, what I claim as new and desire to secure by Letters Patent is:

1. In concrete mixing apparatus, the combination with a mixing drum and charging and discharging means, of means for independently initiating operations of said charging and discharging means, actuating means cooperating with said operation initiating means and constituting a common actuator for selectively controlling the charging and discharging means in a timed relation to each other, and means for rendering either of said initiating means inoperative relative to the common actuator.

2. In concrete mixing apparatus, the combination with a mixing drum and charging and discharging means, of means for independently initiating operations of said charging and discharging means, actuating means cooperating with said operation initiating means and constituting a common actuator for selectively controlling the charging and discharging means in a timed relation to each other, and means for rendering either or both of said initiating means inoperative relative to the common actuator.

3. In concrete mixing apparatus, the combination with a mixing drum, and charging and discharging means, of manual control means for independently controlling the charging and discharging means, and a power operated actuator associated with said manual control means for automatically operating the charging and discharging means mechanically through the manual controls therefor.

4. In concrete mixing apparatus, the combination with a mixing drum, and charging and discharging means, of manual control means for independently controlling the charging and discharging means, a power operated actuator associated with said manual control means for automatically operating the charging and discharging means mechanically through the manual controls therefor, and means for rendering said power actuator inoperative relative to the manual controls and permitting manual operation of the latter.

5. In concrete mixing apparatus, the combination with a mixing drum, means for introducing water thereinto and aggregate charging and discharging means, of a centralized power operated unit having a series of control elements for initiating the operation of the several means aforesaid and actuating means therefor, and means for rendering the actuating means inoperative relative to the control elements.

6. In concrete mixing apparatus, the combination with a mixing drum, means for introducing water thereinto and aggregate charging and discharging means, of a centralized power operated unit having a series of control elements for initiating the operation of the several means aforesaid and actuating means therefor, and means for holding one of said control elements in inoperative relation to the actuating means.

7. In concrete mixing apparatus, the combination with a mixing drum, means for introducing water thereinto and aggregate charging and discharging means, of a centralized power operated unit having a series of control elements for initiating the operation of the several means aforesaid and actuating means therefor, and means for latching out of operative relation to the actuating means any one of said control elements for free independent manipulation.

8. In concrete mixing apparatus, the combination with a mixing drum, means for introducing water thereinto and aggregate charging and discharging means, of a centralized power operated unit having a series of control elements for initiating the operations of the several means aforesaid and actuating means therefor, said actuating means including a series of cams for the control elements arranged in such relation to each other as to produce the charging, discharging and water mixing in proper sequence.

9. In concrete mixing apparatus, the combination with a mixing drum, means for introducing water thereinto and aggregate charging and discharging means, of a centralized power operated unit having a series of control elements for initiating the operations of the several means aforesaid and actuating means therefor, said actuating means including a series of cams for the control elements arranged in such relation to each other as to produce the charging, discharging and water mixing in proper sequence, and means for shifting the cams relative to their controls.

10. In concrete mixing apparatus, the combination with a mixing drum, means for introducing water thereinto and aggregate charging and discharging means, of a centralized power operated unit having a series of control elements for initiating the operations of the several means aforesaid and actuating means therefor, said actuating means including a series of cams for the control elements arranged in such relation to each other as to produce the charging, discharging and water mixing in proper sequence, and means to adjust each cam to change the point of actuation of its control in the sequential operations of the mixer.

11. In concrete mixing apparatus, the combination with a mixing drum, means for introducing water thereinto and aggregate charging and discharging means, of a centralized power operated unit having a series of control elements for initiating the operation of the several means aforesaid and actuating means therefor, means for driving said actuating means, and means to interrupt the drive to the actuating means at a predetermined point in the sequential operation of the charging and discharging to thereby change the mixing period.

12. In concrete mixing apparatus, the combination with a mixing drum, means for introducing water thereinto and aggregate charging and discharging means, of a centralized power operated unit having a series of control elements for initiating the operation of the several means aforesaid and actuating means therefor, power driven means for said actuating means, and an automatically operated camming device to interrupt more or less the power drive to the said actuating means.

13. In concrete mixing apparatus, the combination with a mixing drum, aggregate charging and discharging means, of a centralized control device including manual control levers for said charging and discharging means and a cam shaft having cams mounted thereon for actuating said levers when automatic control of the charging and discharging functions is desired, and means for holding each of the levers in an inoperative relation to the cam shaft.

14. In concrete mixing apparatus, the combination with a mixing drum, aggregate charging and discharging means, of a centralized control device including manual control levers for said charging and discharging means and a cam shaft having cams mounted thereon for actuating said levers when automatic control of the charging and discharging functions is desired, each of said levers being free to operate independently of the cam shaft.

15. A centralized control unit comprising a bank of independent lever controls, a power driven actuator common to said levers and arranged to actuate all of said controls or any one of said lever controls independently of the other controls, and means to shift the common actuator relative to the lever controls to render the latter inoperative from the power source, said lever controls having means to render them inoperable by the actuator when the latter is in normal operative relation to the controls.

16. Control mechanism for concrete mixing machines comprising a control unit embodying a series of levers arranged in adjacent relation to each other on a common support and power operated means therefor, a driving shaft for said power operated means disposed parallel to said support and having spaced lever actuating means thereon, and an interrupter unit arranged between said drive shaft and the power operated means for variably interrupting the drive to the latter.

In testimony whereof I affix my signature.

ERICH H. LICHTENBERG.